United States Patent Office 3,600,148
Patented Aug. 17, 1971

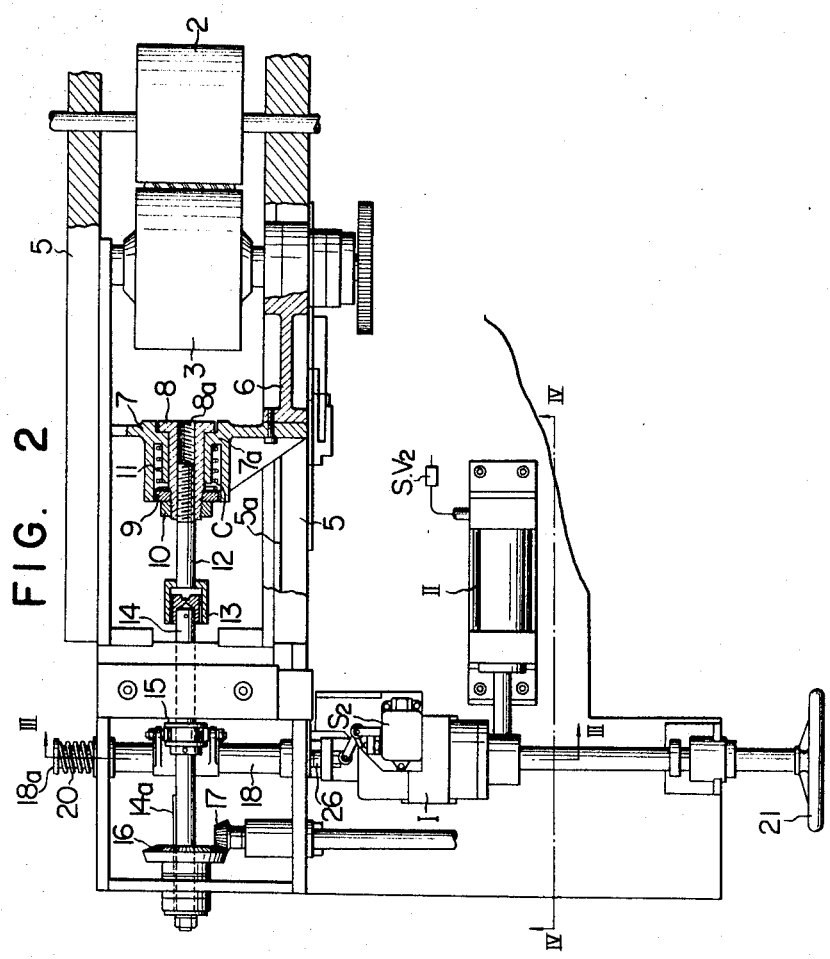

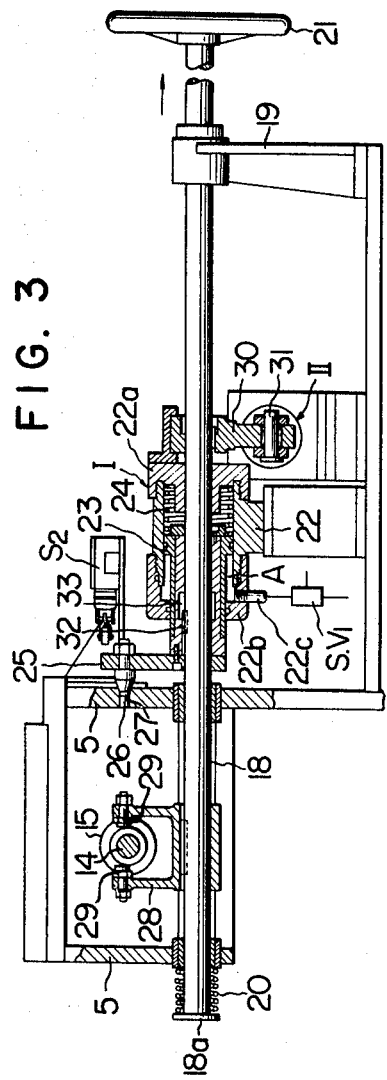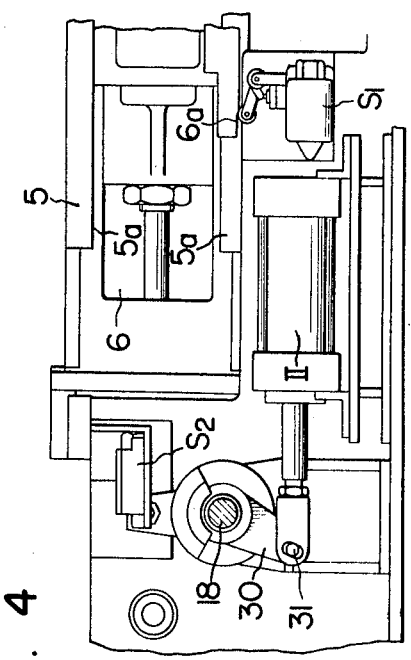

3,600,148
SAFETY DEVICES FOR FEED ROLLS OF GLASS BULB BLOWING APPARATUS
Junji Yamada, Odawara-shi, and Makoto Wada, Kawasaki-shi, Japan, assignors to Tokyo Shibaura Denki Kabushiki Kaisha (also known as Tokyo Shibaura Electric Co., Ltd.), Kawasaki-shi, Japan
Filed July 22, 1969, Ser. No. 843,392
Claims priority, application Japan, July 23, 1968, 43/51,580
Int. Cl. F16p 7/00; C03b 9/13
U.S. Cl. 65—159
4 Claims

ABSTRACT OF THE DISCLOSURE

In a ribbon type glass bulb blowing apparatus, a safety device is provided for a pair of feed rolls adapted to form a stream of molten glass, into a glass ribbon and to separate feed rolls from each other in response to the presence of solid contaminants in the stream of molten glass. One of the feed rolls is supported on a floating bracket which is connected through a coupling to a shifter. The bracket responds to a contaminant in the molten glass and actuates a piston-cylinder which unlocks a locking device. The unlocking actuates another piston-cylinder which rotates a shaft. The shifter is carried by the shaft and is moved by the rotation of the shaft. The movement of the shifter causes the floating bracket, and thus the feed roll, to move. Further, a hand wheel to manually separate feed rolls and to adjust the nip therebetween is also provided.

BACKGROUND OF THE INVENTION

This invention relates to glass bulb blowing apparatus of the so-called ribbon machine type and more particularly to a novel safety device for feed rolls which function to press a stream of molten glass discharged from the orifice of a glass melting furnace into a ribbon shaped strip and to convey the strip to a blow head and a mold operating device which are operated in synchronism as is well known in the art.

It is desirable that the stream of molten glass discharged from the orifice of the glass melting furnace in a glass bulb blowing apparatus be in a uniformly melted state. When abnormal solid contaminants such as lumps of unmelted raw material of glass or foreign substances are admixed with the molten glass not only is the formation of the molten glass ribbon of uniform quality impaired, but the subsequent forming of the glass bulbs is also adversely affected. Therefore, such solid contaminants admixed with the molten glass must be removed, and outer peripheries of feed rolls must be suitably protected against damage due to such contaminants.

SUMMARY OF THE INVENTION

It is an object of this invention to provide a novel safety device for feed rolls to protect them against damage caused by solid contaminants contained in the stream of molten glass and to enable the operator to remove such contaminants.

Another object is to provide a novel safety device wherein one of the feed rolls can be manually moved away from the other to remove solid contaminants.

Still another object of this invention is to make possible the adjustment of the nip between feed rolls to any desired value during operation of the glass bulb blowing machine.

In accordance with a preferred embodiment of this invention there is provided a safety device for feed rolls of a glass bulb blowing apparatus comprising a pair of feed rolls positioned beneath an orifice of a glass melting furnace to shape a stream of molten glass discharged from the orifice into a glass ribbon. A floating bracket is provided for supporting one of feed rolls. The floating bracket is movable in response to solid contaminants in the stream of molten glass to separate feed rolls from each other. A first piston cylinder assembly operates a locking member, and the embodiment comprises means responsive to the movement of the floating bracket for unlocking the locking member, a second piston cylinder assembly, means responsive to the unlocking of the locking member to operate the second piston cylinder assembly, a shifter operatively connected to the floating bracket and means operatively connected to the second piston cylinder assembly to operate the shifter.

BRIEF DESCRIPTION OF THE DRAWING

In the accompanying drawing:

FIG. 2 is a plan view, with parts cut away and some parts in section, of one example of the feed roll safety device of this invention;

FIG. 3 is a section view taken along line III—III in FIG. 2 as viewed in the direction of the arrows; and FIG. 4 is a fragmentary elevation as viewed from the plane indicated by line IV—IV in FIG. 2 in the direction of the arrows.

DESCRIPTION OF THE PREFERRED EMBODIMENT

Figure 1:
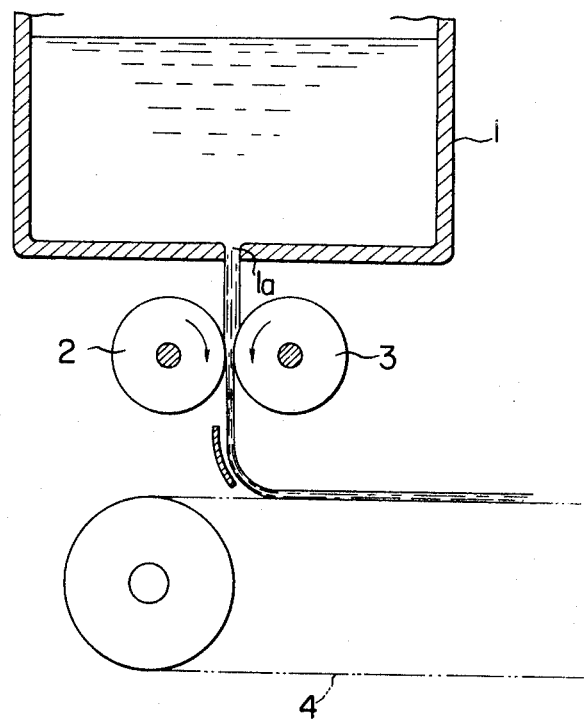
FIG. 1 is a schematic elevation view, partly in section, for an explanation of the principle of the feed roll safety device embodying this invention.

Referring first to FIG. 1, glass material is melted in a melting furnace 1 provided at the bottom part thereof with an orifice 1a through which molten metal can be discharged. A pair of horizontal spaced apart rolls 2 and 3 are rotatably supported beneath the orifice 1a and are adapted to roll the stream of molten glass thus discharged from the orifice 1a into a ribbon form. Although not shown in the drawing, roll 3 is driven through a slip coupling. A horizontal endless conveyor belt 4 is disposed below the rolls 2 and 3 to receive the glass ribbon thus rolled and to continuously convey the same to a blow head device (not shown) and a mold operating device (not shown) which are operated in synchronism.

In one example of the safety device according to this invention as illustrated in FIG. 2, one of the feed rolls (roll 2) is rotatably supported by the machine frame 5 while the other feed roll 3 is rotatably supported by a floating bracket 6. This floating bracket 6 is mounted upon rails 5a horizontally fixed to respective side walls of the machine frame 5 and can be shifted leftward as viewed in FIGS. 2 and 4 by a mechanism described hereinafter.

The inner end of the floating bracket 6 is secured to an end plate 7 having a stopped opening in a central hub 7a to loosely receive a flanged sleeve 8. Screw threads are formed on the outer periphery at one end of the sleeve 8 to receive a clamping nut 10 to firmly secure an annular ring 9 to the flanged sleeve. A small gap C is provided between the inner side of annular ring 9 and the inner end of central hub 7a of the end plate 7, and a compression spring 11 is interposed between the annular ring 9 and hub 7 to normally urge the end plate 7 against the flange of flanged sleeve 8.

Screw threads 8a formed on the inner surface of flanged sleeve 8 receive one end of an adjusting rod 12 to adjust the nip between the pair of feed rolls. The other end of rod 12 is connected to shaft 14 through a coupling 13, the opposite end of the shaft 14 being rotatably supported by one side wall of machine frame 5. An annular member 15 formed with a peripheral groove is securely mounted on shaft 14. A bevel gear 16 spaced apart from annular member 15 is connected to shaft 14 by means of a key 14a so as to be rotatable with the shaft and slidable axially thereof. Bevel gear 16 meshes with bevel gear 17 to be operable manually from outside. Thus, by turning bevel gear 17, adjusting rod 12 connected to shaft 14 is rotated to move the floating bracket and hence feed roll 3 horizontally along rails 5a through the rotation of the threaded inner end of adjusting rod 12.

As shown in FIG. 4, a cam 6a is formed on one side of floating bracket 6 to cooperate with switch $S_1$.

As shown in FIG. 3, below shaft 14 is mounted an operating shaft 18 rotatably journaled by machine frame 5 and bearing stand 19. The left hand end of operating shaft 18 extends outwardly through machine frame 5, and a flange 18a is formed on its outer end to support a compression spring 20 between it and the outer wall of machine frame 5. A hand wheel 21 is secured to the other end of operating shaft 18.

A cylinder 22 secured to the base of the machine is provided so as to concentrically surround the intermediate portion of operating shaft 18, one end of the cylinder being closed by an end plate 22a. The opposite end of the cylinder is closed by a cap 22b suitably secured thereto. Within cylinder 22, a piston 23 is keyed to operating shaft 18 by means of key 32 so as to rotate therewith and to move axially thereof. A compression spring 24 is disposed between piston 23 and end plate 22a. An arm 25 is secured to the outer end of piston 23 and a horizontal locking pin 24 is secured to the free end of the arm to normally engage an opening 27 through the side wall of machine frame 5. A pipe 22c is connected to a suitable portion of cylinder cap 22b to admit and discharge an operating fluid, such as compressed air, supplied through an operating valve $SV_1$ such as a three-way electromagnetic valve $SV_2$ is actuated by switch $S_1$ to admit the operating fluid into the cylinder to move piston 23 toward the right as viewed in FIG. 3 against the bias of spring 24.

A bifurcated shifter 28 is keyed near the outer or left hand end of shaft 18 to rotate therewith and slidable longitudinally thereof. The upper end of the shifter carries a pair of rollers 29 which is loosely received in the peripheral groove of annular member 5. As shown in FIG. 4, an arm 30 is secured to operating shaft 18 adjacent said piston-cylinder assembly I with its outer end pivotally connected at 31 to the outer end of the piston rod of another piston-cylinder assembly II identical to piston-cylinder assembly I.

As diagrammatically shown in FIGS. 2 and 3, piston-cylinder assembly II is operated via an operating valve $SV_2$. When switch $S_2$ disposed in the path of arm 25 carrying locking pin 26 is closed.

The safety device as above described operates as follows.

Should the stream of molten glass discharged from the orifice 1a of glass melting furnace contain a relatively small solid contaminant for some reason, such a solid contaminant causes roll 3 to move toward the left through gap c against the bias of spring 11 together with the floating bracket 6 when such a stream is fed into the nip between the feed rolls. In this case, all other mechanisms do not operate.

However, when relatively large solid contaminants are fed between feed rolls 2 and 3, they impose a large load upon these rolls causing roll 3 to be disengaged from the driving source owing to above described slip coupling. Accordingly, rotation of roll 3 is stopped, and the floating bracket 6 and end plate move leftward to a point closer to annular ring 9 than in the previous case. Immediately before engagement of annular ring 9 and the inner end of central hub 7a, cam 6a (FIG. 4) on floating bracket 6 comes to actuate switch $S_1$ and hence operating valve $SV_1$ to supply pressurized operating fluid to the cylinder of piston-cylinder assembly I, thus moving piston 23 to the right as viewed in FIG. 3 against the force of spring 24. This movement of the piston causes locking pin 26 on arm 25 carried by piston 23 to disengage opening 27 of machine frame 5 and to close switch $S_2$ to operate the other piston-cylinder assembly II via operating valve $SV_2$ shown in FIG. 2. Thus, this assembly II rotates arm 30 in the counterclockwise direction about operating shaft 18, as viewed in FIG. 4, thus causing the operating shaft to rotate in the same direction. As a consequence, shifter 28 carried by operating shaft 18 is moved toward the left as viewed in FIG. 2 together with annular member 15 with the result that adjusting rod 12 connected to shaft 14 moves floating bracket 6 in the same direction along rails 5 to move feed roll away from feed roll 2. After the solid contaminants have been suitably removed operating valve $SV_2$ is manually deenergized to restore the piston rod of the piston-cylinder assembly to the position shown in FIG. 4 by a spring (not shown) contained in the cylinder. As a result arm 30 is also restored to the original position so that operating shaft 18 restores floating bracket 6 and feed roll 3 to their original states through shifter 28 and ring member 15.

When operating shaft 18 is moved toward the right as viewed in FIG. 3 by pulling hand wheel 21 against the action of spring 20, key 32 aligns with annular groove 33 of piston 23, so that operating shaft 18 will be disconnected from piston 23. When hand wheel 21 is rotated in the counterclockwise direction as viewed in FIG. 4 while it is being pulled toward the right as viewed in FIG. 3, annular ring 15 clamped between rollers 29 of the shifter 28 is moved toward the left as viewed in FIG. 2 as the shaft 18 is rotated so that the floating bracket 6 and feed roll 3 are moved toward the left through adjusting rod 12. Upon restoration of hand wheel 21, feed roll 3 is also restored to its original position.

In this manner, whenever any abnormal material not suitable for the glass ribbon flows out from the glass melting furnace, the operator manually separates feed rolls 2 and 3 to remove such abnormal material.

Thus, according to this invention since reed roll 3 is moved away from feed roll 2 by a distance proportional to the size of solid contaminant it is not necessary to always operate a number of piston cylinder assemblies. In addition, it is possible to readily adjust the thickness of glass ribbons or the nip between rolls 2 and 3 during operation thereof dependent upon the type and size of electric bulbs to be manufactured.

We claim:

1. A safety device for feed rolls of a glass bulb blowing apparatus comprising a pair of feed rolls positioned beneath an orifice of a glass melting furnace to shape a stream of molten glass discharged from said orifice into a glass ribbon, a floating bracket for supporting one of said feed rolls, said bracket being movable in response to an abnormal condition of said stream of molten glass, means responsive to the movement of said floating bracket to unlock a locking device which is normally held in the locking position, a shifter operatively connected to said floating bracket, and means responsive to the unlocking of said locking device to operate said shifter to move one of said rolls away from the other upon occurrence of said abnormal condition.

2. A safety device for feed rolls of a glass bulb blowing apparatus comprising a pair of feed rolls positioned beneath an orifice of a glass melting furnace to shape a stream of molten glass discharged from said orifice into a glass ribbon, a floating bracket for supporting one of said feed rolls, said floating bracket being movable in response to the presence of solid contaminants in said stream of molten glass to separate said feed roll from each other, a first piston-cylinder assembly to operate a locking member, means responsive to the movement of said floating bracket to unlock said locking member, a second piston-cylinder assembly, means responsive to the unlocking of said locking member to operate said second piston-cylinder assembly, a shifter operatively connected to said floating bracket, and means operatively connected to said second piston-cylinder assembly to operate said shifter.

3. The safety device according to claim 2 wherein means is provided to adjust the connection between said shifter and said floating bracket to adjust the nip between said feed rolls.

4. The safety device according to claim 2 wherein a manually operating means is provided to operate said shifter independently of said piston-cylinder assemblies.

References Cited

UNITED STATES PATENTS 2,972,210  2/1961  Broman et al.  65—158X

S. LEON BASHORE, Primary Examiner

S. R. FRIEDMAN, Assistant Examiner

U.S. Cl. X.R.

65—160; 192—127, 129